Dec. 22, 1964  C. J. BLAZE ETAL  3,162,012
FORMED METAL RIBBON WRAP
Filed May 4, 1961  2 Sheets-Sheet 1

INVENTORS
CASEY J. BLAZE
CARL G. RICHTER

BY

ATTORNEY

Dec. 22, 1964   C. J. BLAZE ETAL   3,162,012
FORMED METAL RIBBON WRAP

Filed May 4, 1961   2 Sheets-Sheet 2

INVENTORS
CASEY J. BLAZE
CARL G. RICHTER

BY

ATTORNEY

3,162,012
FORMED METAL RIBBON WRAP
Casey J. Blaze and Carl G. Richter, both of Parma, Ohio, assignors to the United States of America as represented by the Administrator of the National Aeronautics and Space Administration
Filed May 4, 1961, Ser. No. 107,870
7 Claims. (Cl. 60—39.66)
(Granted under Title 35, U.S. Code (1952), sec. 266)

The invention described herein may be manufactured and used by or for the Government of the United States of America for governmental purposes without the payment of any royalties thereon or therefor.

This invention relates generally to high temperature combustion chamber outer wall construction, and more particularly to a combustion chamber outer wall channel construction of the type commonly used in reaction thrust motors, and the method of fabrication thereof.

To permit continuous operation over extended periods of time of reaction type motor, such for example as rockets, or the like, it has been found necessary to maintain the temperature of the thin and lightweight combustion chamber low. One present day arrangement for accomplishing this result employs a number of channels assembled together to form the outer wall of a chamber, about which is wrapped a wire of circular, square, or triangular configuration to provde, in conjunction with the assembled channels, conduits for the flow of a coolant medium. A particularly suitable present day reaction motor combustion chamber construction of this type employs the fluid propellant as the cooling medium in addition to its primary function as a propellant. An example of a regeneratively cooled rocket thrust chamber construction is disclosed in United States Patent No. 2,943,442.

Although regeneratively cooled combustion chambers of the wrapped channel wall type have performed satisfactorily in providing a relatively lightweight and thin wall construction capable of withstanding very high combustion temperatures, leaks would frequently develop in the outer wall when subjected to high coolant pressures. Additionally, fabrication operations tended to be interrupted and prolonged due to frequent breaking of the wire wrap.

Accordingly, it is an object of the present invention to provide a new and improved thin and lightweight outer shell construction for a combustion chamber.

Another object of this invention is to provide a new and improved method of manufacture of a channel type combustion chamber outer wall.

Still another object of the invention is to provide a new and improved high pressure resistant outer shell for a regeneratively cooled combustion chamber.

Briefly, in accordance with one aspect of this invention, these and other objects are attained by providing an outer shell composed of a closed assembly of adjoining U-shaped channel members transversely wrapped by a continuous length of ribbon capable of interlocking with adjacent turns of the ribbon, and secured to each other and to the ribs of the channels at points of contact therebetween.

A more complete appreciation of the invention and many of the attendant advantages thereof will be readily appreciated as the same becomes better understood by reference to the following detailed description when considered in connection with the accompanying drawings wherein.

Figure 1:
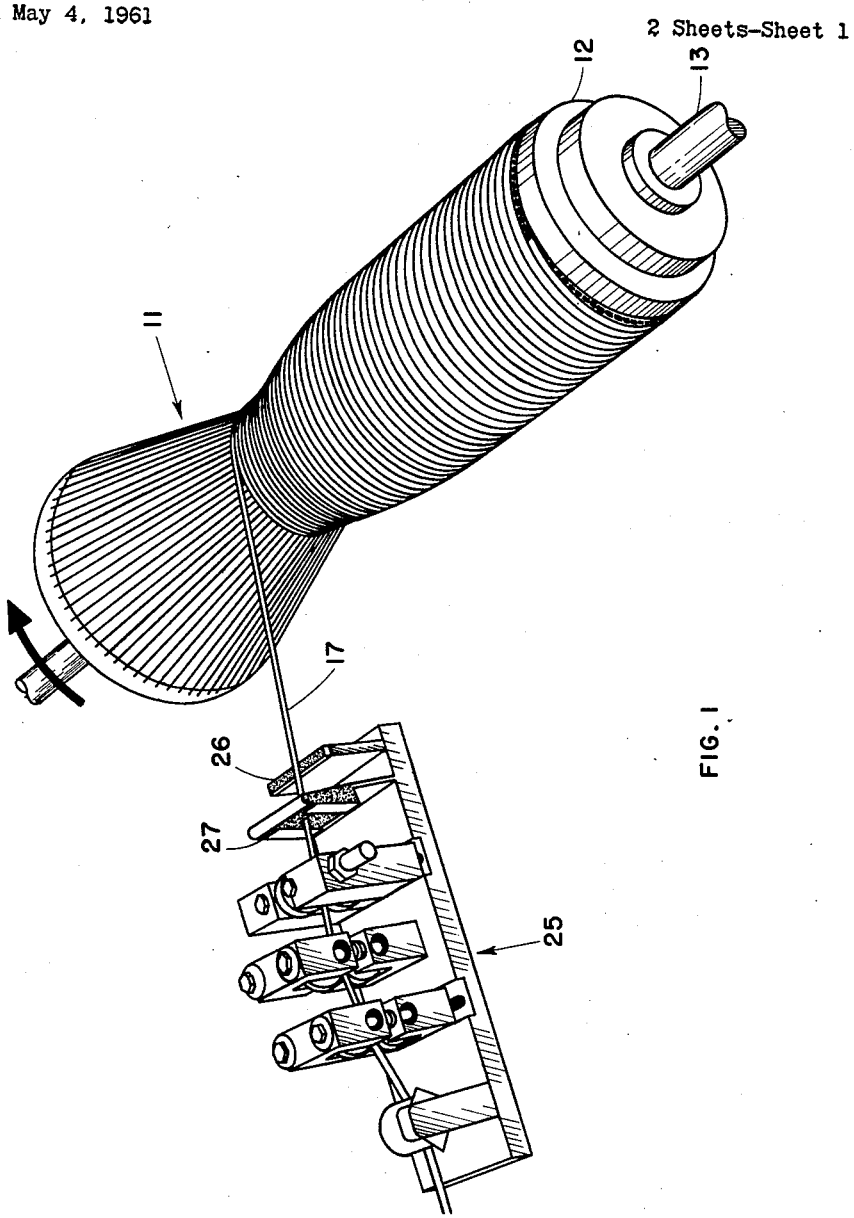
FIG. 1 is an isometric view illustration of the fabrication process of the combustion chamber outer wall construction according to the present invention.
Figure 2:
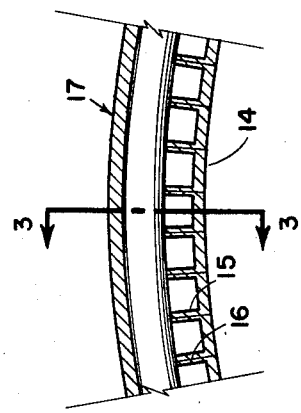
FIG. 2 is a cross-sectional view of the outer wall construction.

Referring now to the drawings wherein like reference numerals designate identical or corresponding parts throughout the several views, and more particularly to FIG. 1 thereof whereon the shell for a combustion chamber according to the present invention, designated generally by the reference numeral 11, is shown as mounted on a mandrel 12 during the manufacture thereof. The mandrel 12 is adapted to being rotated by a shaft 13, such for example as that of a lathe (not shown), for purposes to be explained more fully hereinafter. As more clearly shown in FIG. 2, the shell 11 is fabricated of a plurality of longitudinal U-shaped channels 14 formed from a material capable of withstanding the high operating temperatures of the combustion chamber, as well as the corrosive action of the propellant, and having the ribs 15 thereof extending radially outward. These channels are joined together in a continuous assembly in a suitable manner, such for example as by use of a brazing material 16 placed between each of the channels during the fabrication process. However, the ribbon may serve to bind the channels, as will be described subsequently. By rotation of the shaft 13, as indicated by the directional arrow, continuous turns of a ribbon 17 which may be formed of the same material as the channel members, is wound athwartwise about and along the entire length of the channel assembly in a series of contiguous turns.

Figure 3:
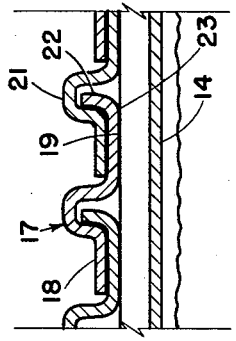
FIG. 3 is a sectional view of the outer wall construction taken along the line 3—3 of FIG. 2.

As more clearly shown in FIG. 3, the ribbon wrapping 17, in cross-section, is formed of two flat surfaces or portions 18 and 19 in different planes separated by a U-shaped ridge portion 21. The underside of flat portions 18 and 19 is coated with a brazing material 23. An upturned edge 22 is formed on the flat portion 19. The several portions of ribbon 17 are so dimensioned and shaped that portion 18 of one turn of the ribbon will conformingly sit atop portion 19 of an adjacent turn while simultaneously the upturned edge 22 will conformingly abut an inner face of the ridge portion 21. By this arrangement, ribbon 17 readily converts the rectangular channels 14 into coolant passages and also serves to mechanically bind the channels together in the assembled configuration. Brazing of the superposed portions 18 and 19 of adjacent turns of the ribbon and the ribs 15 of the channels to the ribbon at their points of contact provides for a leakproof and rigidly interlocked type of shell for a combustion chamber. It is to be understood that in lieu of brazing, spot welding of the members can be readily utilized.

As shown in FIG. 1 of the drawings, the interlocking ribbon 17 wrapped about the channel assembly may itself be formed during the outer shell fabrication process by passing a flat ribbon 24 through a shaping device 25 composed of a set of conventional Lockformer rolls provided with rolls suitable to impart the desired cross-sectional configuration to form the interlocking or interconnecting tape 17. The brazing material 23 may be applied to the underside of tape 17 by a conventional applicator, such for example as a brush 26. A conventional wiper, such for example as a felt piece 27, may be provided to suitably clean the ribbon 17 before the application of the brazing material thereto. Obviously, the shaping device 25 is movable along the length of the assembly 11 to allow for complete wrapping thereof by the ribbon 17.

It will be apparent that although the coolant flow type wall construction disclosed herein has been particularly described in connection with reaction motor combustion chambers, that it is not so limited and is equally utilizable in other applications wherein high temperatures and coolant pressures are to be encountered, such for example as in gas generators and arc jet chambers.

Obviously, numerous modifications and variations of the present invention are possible in the light of the above teachings. It is, therefore, to be understood that within the scope of the appended claims the invention may be practiced otherwise than as specifically described herein.

What is claimed is:

1. A combustion chamber comprising a multiplicity of elongated channels secured together in an assembly to form a hollow enclosure with the ribs of said channels extending outwardly of said enclosure, a continuous length of ribbon wound about the ribs of said assembly of channels in contiguous turns, said ribbon having coacting surfaces for forming an interlink between the adjacent turns thereof and means for rigidizing the interlink between said adjacent turns.

2. A combustion chamber comprising a plurality of U-shaped elongated channels arranged contiguously in an assembly to form a hollow enclosure with the ribs of said channels extending radially outward, a continuous length of ribbon wound athwartwise about said ribs of said assembly of channels in contiguous turns along substantially the entire length thereof, said ribbon having coacting surfaces for forming an interlink between the adjacent turns thereof, brazing material disposed on said ribbon for effecting a rigid interlink between said adjacent turns and for rigidly securing said ribbon about said assembly of channels.

3. A method of fabricating a closed wall construction comprising the steps of abuttingly arranging a plurality of elongated channel members in a closed assembly, rotating said assembly of abutting channels, wrapping said rotating assembly with consecutive turns of an integral length of ribbon capable of interlocking with adjacent turns of the ribbon, applying a brazing material to said ribbon prior to wrapping thereof about said assembly, and subsequently heating said wrapped assembly to effect a rigid bond between adjacent turns of said ribbon.

4. In a combustion chamber of the type having elongated channels arranged contiguously in an assembly to form a hollow enclosure with the ribs of said channels extending radially outward into contact with a continuous length of ribbon wound about said assembly to form a series of coolant passages, the improvement comprising a centrally disposed ridge portion in said ribbon, and a pair of spaced flat portions extending from opposite sides of said ridge portion.

5. In a combustion chamber of the type having elongated channels arranged contiguously in an assembly to form a hollow enclosure with the ribs of said channels extending radially outward into contact with a continuous length of ribbon wound about said assembly to form a series of coolant passages, the improvement comprising a generally U-shaped ridge portion formed in said ribbon, a first flat portion extending from one side of said ridge portion in a first plane, and a second flat portion extending from the opposite side of said ridge portion in a second plane, said first plane being spaced from said second plane a distance substantially equal to the thickness of said ribbon whereby said first flat portion of one turn of said ribbon engages said second flat portion of an adjacent turn.

6. The structure claimed in claim 5, including an upturned edge portion on said first flat portion remote from said ridge portion for abutting an inner face of the ridge portion of an adjacent turn of said ribbon.

7. In a method of fabricating a regeneratively cooled combustion chamber of the type wherein an elongated ribbon is wrapped about a plurality of cooling passages with portions of consecutive turns overlapping to form an outer wall construction about the chamber, the improvement comprising the steps of forming an upturned edge with a ridge spaced therefrom and parallel thereto on the ribbon prior to the wrapping thereof so that said edge abuts the inner surface of the ridge of an adjacent turn upon wrapping to interlock the wrap, applying a brazing material to the ribbon prior to the wrapping thereof, and subsequently heating the wrapped interlocked outer wall construction to effect a rigid bond between adjacent turns of the ribbon.

References Cited by the Examiner

UNITED STATES PATENTS

| 1,983,239 | 12/34 | Munday | 138—135 X |
| 1,987,794 | 1/35 | Phillips | 138—135 X |
| 2,288,094 | 6/42 | Karmazin | 113—35 |
| 2,351,152 | 6/44 | Schick. | |
| 2,758,366 | 8/56 | Voetelink | 113—35 X |
| 2,820,615 | 1/58 | Peters | 257—241 |
| 2,943,442 | 7/60 | Baehr | 60—35.6 |
| 3,044,257 | 7/62 | Shesta | 60—35.6 |
| 3,092,961 | 6/63 | Dobell | 29—452 X |
| 3,136,036 | 6/64 | Dobell | 60—35.6 X |

OTHER REFERENCES

Space Aeronautics, vol. 33, No. 5, May 1960, pages 117, 118, 120, 122, 126, 130, 132.

SAMUEL LEVINE, *Primary Examiner*.

CORNELIUS D. ANGEL, *Examiner*.